US010008213B2

(12) United States Patent
Liljeryd et al.

(10) Patent No.: US 10,008,213 B2
(45) Date of Patent: Jun. 26, 2018

(54) SPECTRAL TRANSLATION/FOLDING IN THE SUBBAND DOMAIN

(71) Applicant: Dolby International AB, Amsterdam Zuidoost (NL)

(72) Inventors: Lars G. Liljeryd, Stocksund (SE); Per Ekstrand, Saltsjobaden (SE); Fredrik Henn, Huddinge (SE); Kristofer Kjoerling, Solna (SE)

(73) Assignee: Dolby International AB, Amsterdam (NL)

( * ) Notice: Subject to any disclaimer, the term of this patent is extended or adjusted under 35 U.S.C. 154(b) by 0 days. days.

(21) Appl. No.: 15/677,454

(22) Filed: Aug. 15, 2017

(65) Prior Publication Data

US 2017/0345432 A1 Nov. 30, 2017

Related U.S. Application Data

(60) Division of application No. 15/446,535, filed on Mar. 1, 2017, now Pat. No. 9,786,290, which is a division (Continued)

(30) Foreign Application Priority Data

May 23, 2000 (SE) ...................................... 0001926

(51) Int. Cl.
*G06F 17/00* (2006.01)
*G10L 19/02* (2013.01)
(Continued)

(52) U.S. Cl.
CPC ...... *G10L 19/0208* (2013.01); *G10L 19/0017* (2013.01); *G10L 19/26* (2013.01);
(Continued)

(58) Field of Classification Search
CPC ......... G10L 1/02; G10L 1/0204; G10L 1/032; G10L 1/0212; G10L 1/022;
(Continued)

(56) References Cited

U.S. PATENT DOCUMENTS

| | | | |
|---|---|---|---|
| 3,914,554 | A | 10/1975 | Seidel |
| 4,166,924 | A | 9/1979 | Berkley |

(Continued)

FOREIGN PATENT DOCUMENTS

| | | |
|---|---|---|
| EP | 0485444 | 5/1992 |
| EP | 0501690 | 9/1992 |

(Continued)

OTHER PUBLICATIONS

Hemami, S. et al. "Subband-Coded Image Reconstruction for Lossy Packet Networks" IEEE Transactions on Image Processing, vol. 6, No. 4, Apr. 1997, pp. 523-539.

(Continued)

*Primary Examiner* — Andrew C Flanders

(57) ABSTRACT

The present invention relates to a new method and apparatus for improvement of High Frequency Reconstruction (HFR) techniques using frequency translation or folding or a combination thereof. The proposed invention is applicable to audio source coding systems, and offers significantly reduced computational complexity. This is accomplished by means of frequency translation or folding in the subband domain, preferably integrated with spectral envelope adjustment in the same domain. The concept of dissonance guard-band filtering is further presented. The proposed invention offers a low-complexity, intermediate quality HFR method useful in speech and natural audio coding applications.

7 Claims, 5 Drawing Sheets

Related U.S. Application Data of application No. 15/370,054, filed on Dec. 6, 2016, now Pat. No. 9,697,841, which is a continuation of application No. 14/964,836, filed on Dec. 10, 2015, now Pat. No. 9,548,059, which is a continuation of application No. 13/969,708, filed on Aug. 19, 2013, now Pat. No. 9,245,534, which is a continuation of application No. 13/460,797, filed on Apr. 30, 2012, now Pat. No. 8,543,232, which is a continuation of application No. 12/703,553, filed on Feb. 10, 2010, now Pat. No. 8,412,365, which is a continuation of application No. 12/253,135, filed on Oct. 16, 2008, now Pat. No. 7,680,552, which is a continuation of application No. 10/296,562, filed as application No. PCT/SE01/01171 on May 23, 2001, now Pat. No. 7,483,758.

(51) Int. Cl.
*G10L 21/038* (2013.01)
*G10L 19/26* (2013.01)
*G10L 19/00* (2013.01)

(52) U.S. Cl.
CPC .......... *G10L 19/265* (2013.01); *G10L 21/038* (2013.01); *G10L 19/0204* (2013.01)

(58) Field of Classification Search
CPC . G10L 21/0388; G10L 21/038; G10L 19/208; G10L 19/0017; G10L 19/26; H04B 1/66; H04B 1/667; G06F 3/16; G06F 3/165
See application file for complete search history.

(56) References Cited

U.S. PATENT DOCUMENTS

| | | | |
|---|---|---|---|
| 4,216,354 | A | 8/1980 | Esteban |
| 4,255,620 | A | 3/1981 | Harris |
| 4,330,689 | A | 5/1982 | Kang |
| 4,374,304 | A | 2/1983 | Flanagan |
| 4,569,075 | A | 2/1986 | Nussbaumer |
| 4,667,340 | A | 5/1987 | Arjmand |
| 4,672,670 | A | 6/1987 | Wang |
| 4,692,050 | A | 9/1987 | Kaufman |
| 4,700,362 | A | 10/1987 | Todd |
| 4,771,465 | A | 9/1988 | Bronson |
| 4,776,014 | A | 10/1988 | Zinser, Jr. |
| 4,790,016 | A | 12/1988 | Mazor |
| 4,799,179 | A | 1/1989 | Masson |
| 4,914,701 | A | 4/1990 | Zibman |
| 4,969,040 | A | 11/1990 | Gharavi |
| 5,001,758 | A | 3/1991 | Galand |
| 5,040,217 | A | 8/1991 | Brandenburg |
| 5,054,072 | A | 10/1991 | McAulay |
| 5,068,899 | A | 11/1991 | Ellis |
| 5,093,863 | A | 3/1992 | Galand |
| 5,127,054 | A | 6/1992 | Hong et al. |
| 5,235,420 | A | 8/1993 | Gharavi |
| 5,235,671 | A | 8/1993 | Mazor |
| 5,261,027 | A | 11/1993 | Taniguchi |
| 5,285,520 | A | 2/1994 | Matsumoto |
| 5,293,449 | A | 3/1994 | Tzeng |
| 5,321,793 | A | 6/1994 | Drogo De Iacovo |
| 5,396,237 | A | 3/1995 | Ohta |
| 5,438,643 | A | 8/1995 | Akagiri |
| 5,490,233 | A | 2/1996 | Kovacevic |
| 5,579,434 | A | 11/1996 | Kudo |
| 5,581,653 | A | 12/1996 | Todd |
| 5,604,810 | A | 2/1997 | Yanagawa |
| 5,677,985 | A | 10/1997 | Ozawa |
| 5,684,920 | A | 11/1997 | Iwakami |
| 5,687,191 | A | 11/1997 | Lee |
| 5,692,050 | A | 11/1997 | Hawks |
| 5,701,390 | A | 12/1997 | Griffin |
| 5,757,938 | A | 5/1998 | Akagiri |
| 5,781,888 | A | 7/1998 | Herre |
| 5,787,387 | A | 7/1998 | Aguilar |
| 5,822,370 | A | 10/1998 | Graupe |
| 5,848,164 | A | 12/1998 | Levine |
| 5,867,819 | A | 2/1999 | Fukuchi |
| 5,875,122 | A | 2/1999 | Archarya |
| 5,878,388 | A | 3/1999 | Nishiguchi |
| 5,889,857 | A | 3/1999 | Boudy |
| 5,913,191 | A | 6/1999 | Fielder |
| 5,915,235 | A | 6/1999 | Dejaco |
| 6,144,937 | A | 11/2000 | Ali |
| 6,233,551 | B1 | 5/2001 | Cho |
| 6,456,657 | B1 | 9/2002 | Yeap |
| 7,483,758 | B2 | 1/2009 | Liljeryd |
| 7,680,552 | B2 | 3/2010 | Liljeryd |
| 8,412,365 | B2 | 4/2013 | Liljeryd |
| 8,543,232 | B2 | 9/2013 | Liljeryd |
| 9,245,534 | B2 | 1/2016 | Liljeryd |
| 2002/0123975 | A1 | 9/2002 | Poluzzi |
| 2003/0158726 | A1 | 8/2003 | Philippe |

FOREIGN PATENT DOCUMENTS

| | | |
|---|---|---|
| EP | 1119911 | 8/2001 |
| GB | 2344036 | 1/2004 |
| JP | 5-191885 | 7/1993 |
| JP | 6-85607 | 3/1994 |
| JP | 6-118995 | 4/1994 |
| JP | 9-46233 | 2/1997 |
| JP | 9-55778 | 2/1997 |
| JP | 9-90992 | 4/1997 |
| JP | 9-101798 | 4/1997 |
| WO | 98/57436 | 12/1998 |
| WO | 00/45379 | 8/2000 |

OTHER PUBLICATIONS

Kubin, Gernot "Synthesis and Coding of Continuous Speech with the Nonlinear Oscillator Model" 1996 IEEE, pp. 267-270.
Plomp, R. et al. "Tonal Consonance and Critical Bandwidth" J. Acoust. Soc. Am. vol. 38, Issue 4, pp. 548-560, Apr. 1965.
Princen, J.P. et al. "Analysis/Synthesis Filter Bank Design Based on Time Domain Aliasing Cancellation" IEEE Transactions on Acoustics, Speech, and Signal Processing, vol. ASSP-34, No. 5, Oct. 1986, pp. 1153-1161.
Schroeder, M. R. "An Artificial Stereophonic Effect Obtained from Using a Single Signal", Journal of the Audio Engineering Society, presented at the 9th annual meeting Oct. 8-12, 1957.
Vaidyanathan, P. P. "Multirate Digital Filters, Filter Banks, Polyphase Networks, and Applications: A Tutorial" Proceedings of the IEEE, vol. 78, No. 1, Jan. 1990, pp. 56-93.

SPECTRAL TRANSLATION/FOLDING IN THE SUBBAND DOMAIN

CROSS-REFERENCE TO RELATED APPLICATIONS

This application is a divisional of U.S. patent application Ser. No. 15/446,535, filed Mar. 1, 2017, which is a divisional of U.S. patent application Ser. No. 15/370,054 filed Dec. 6, 2016, now U.S. Pat. No. 9,697,841, which is a continuation of U.S. patent application Ser. No. 14/964,836 filed Dec. 10, 2015, now U.S. Pat. No. 9,548,059, which is a continuation of U.S. patent application Ser. No. 13/969,708 filed Aug. 19, 2013, now U.S. Pat. No. 9,245,534, which is a continuation of U.S. patent application Ser. No. 13/460,797 filed Apr. 30, 2012, now U.S. Pat. No. 8,543,232, which is a continuation of U.S. patent application Ser. No. 12/703,553 filed Feb. 10, 2012, now U.S. Pat. No. 8,412,365, which is a continuation of U.S. patent application Ser. No. 12/253,135 filed Oct. 16, 2008, now U.S. Pat. No. 7,680,552, which is a continuation of U.S. patent application Ser. No. 10/296,562 filed Jan. 6, 2004, now U.S. Pat. No. 7,483,753 which is a national—stage entry of International patent application no. PCT/SE01/01171 filed May 23, 2001, which claims the benefit of International application no. 0001926-5 filed on May 23, 2000, all of which are hereby incorporated by reference.

TECHNICAL FIELD

The present invention relates to a new method and apparatus for improvement of High Frequency Reconstruction (HFR) techniques, applicable to audio source coding systems. Significantly reduced computational complexity is achieved using the new method. This is accomplished by means of frequency translation or folding in the subband domain, preferably integrated with the spectral envelope adjustment process. The invention also improves the perceptual audio quality through the concept of dissonance guard-band filtering. The proposed invention offers a low-complexity, intermediate quality HFR method and relates to the PCT patent Spectral Band Replication (SBR) [WO 98/57436].

BACKGROUND OF THE INVENTION

Schemes where the original audio information above a certain frequency is replaced by gaussian noise or manipulated lowband information are collectively referred to as High Frequency Reconstruction (HFR) methods. Prior-art HFR methods are, apart from noise insertion or non-linearities such as rectification, generally utilizing so-called copy-up techniques for generation of the highband signal. These techniques mainly employ broadband linear frequency shifts, i.e. translations, or frequency inverted linear shifts, i.e. foldings. The prior-art HFR methods have primarily been intended for the improvement of speech codec performance. Recent developments in highband regeneration using perceptually accurate methods, have however made HFR methods successfully applicable also to natural audio codecs, coding music or other complex programme material, PCT patent [WO 98/57436]. Under certain conditions, simple copy-up techniques have shown to be adequate when coding complex programme material as well. These techniques have shown to produce reasonable results for intermediate quality applications and in particular for codec implementations where there are severe constraints for the computational complexity of the overall system.

The human voice and most musical instruments generate quasistationary tonal signals that emerge from oscillating systems. According to Fourier theory, any periodic signal may be expressed as a sum of sinusoids with frequencies f, 2f, 3f, 4f, 5f etc. where f is the fundamental frequency. The frequencies form a harmonic series. Tonal affinity refers to the relations between the perceived tones or harmonics. In natural sound reproduction such tonal affinity is controlled and given by the different type of voice or instrument used. The general idea with HFR techniques is to replace the original high frequency information with information created from the available lowband and subsequently apply spectral envelope adjustment to this information. Prior-art HFR methods create highband signals where tonal affinity often is uncontrolled and impaired. The methods generate non-harmonic frequency components which cause perceptual artifacts when applied to complex programme material. Such artifacts are referred to in the coding literature as "rough" sounding and are perceived by the listener as distortion.

Sensory dissonance (roughness), as opposed to consonance (pleasantness), appears when nearby tones or partials interfere. Dissonance theory has been explained by different researchers, amongst others Plomp and Levelt ["Tonal Consonance and Critical Bandwidth" R. Plomp, W. J. M. Levelt JASA, Vol 38, 1965], and states that two partials are considered dissonant if the frequency difference is within approximately 5 to 50% of the bandwidth of the critical band in which the partials are situated. The scale used for mapping frequency to critical bands is called the Bark scale. One bark is equivalent to a frequency distance of one critical band. For reference, the function $$z(f) = \frac{26.81}{1 + \frac{1960}{f}} - 0.53 \text{ [Bark]} \tag{1}$$

can be used to convert from frequency (f) to the bark scale (z). Plomp states that the human auditory system can not discriminate two partials if they differ in frequency by approximately less than five percent of the critical band in which they are situated, or equivalently, are separated less than 0.05 Bark in frequency. On the other hand, if the distance between the partials are more than approximately 0.5 Bark, they will be perceived as separate tones.

Dissonance theory partly explains why prior-art methods give unsatisfactory performance. A set of consonant partials translated upwards in frequency may become dissonant. Moreover, in the crossover regions between instances of translated bands and the lowband the partials can interfere, since they may not be within the limits of acceptable deviation according to the dissonance-rules.

SUMMARY OF THE INVENTION

The present invention provides a new method and device for improvements of translation or folding techniques in source coding systems. The objective includes substantial reduction of computational complexity and reduction of perceptual artifacts. The invention shows a new implementation of a subsampled digital filter bank as a frequency translating or folding device, also offering improved crossover accuracy between the lowband and the translated or folded bands. Further, the invention teaches that crossover regions, to avoid sensory dissonance, benefits from being filtered. The filtered regions are called dissonance guard-bands, and the invention offers the possibility to reduce dissonant partials in an uncomplicated and accurate manner using the subsampled filterbank.

The new filterbank based translation or folding process may advantageously be integrated with the spectral envelope adjustment process. The filterbank used for envelope adjustment is then used for the frequency translation or folding process as well, in that way eliminating the need to use a separate filterbank or process for spectral envelope adjustment. The proposed invention offers a unique and flexible filterbank design at a low computational cost, thus creating a very effective translation/folding/envelope-adjusting system.

In addition, the proposed invention is advantageously combined with the Adaptive Noise-Floor Addition method described in PCT patent [SE00/00159]. This combination will improve the perceptual quality under difficult programme material conditions.

The proposed subband domain based translation of folding technique comprise the following steps:

- filtering of a lowband signal through the analysis part of a digital filterbank to obtain a set of subband signals;
- repatching of a number of the subband signals from consecutive lowband channels to consecutive highband channels in the synthesis part of a digital filterbank;
- adjustment of the patched subband signals, in accordance to a desired spectral envelope; and
- filtering of the adjusted subband signals through the synthesis part of a digital filterbank, to obtain an envelope adjusted and frequency translated or folded signal in a very effective way.

Attractive applications of the proposed invention relates to the improvement of various types of intermediate quality codec applications, such as MPEG 2 Layer III, MPEG 2/4 AAC, Dolby AC-3, NTT TwinVQ, AT&T/Lucent PAC etc. where such codecs are used at low bitrates. The invention is also very useful in various speech codecs such as G. 729 MPEG-4 CELP and HVXC etc to improve perceived quality. The above codecs are widely used in multimedia, in the telephone industry, on the Internet as well as in professional multimedia applications.

BRIEF DESCRIPTION OF THE DRAWINGS

The present invention is described by way of illustrative examples, not limiting the scope or spirit of the invention, with reference to the accompanying drawings, in which.

DESCRIPTION OF PREFERRED EMBODIMENTS

Digital Filterbank Based Translation and Folding

New filter bank based translating or folding techniques will now be described. The signal under consideration is decomposed into a series of subband signals by the analysis part of the filterbank. The subband signals are then repatched, through reconnection of analysis- and synthesis subband channels, to achieve spectral translation or folding or a combination thereof.

Figure 2:
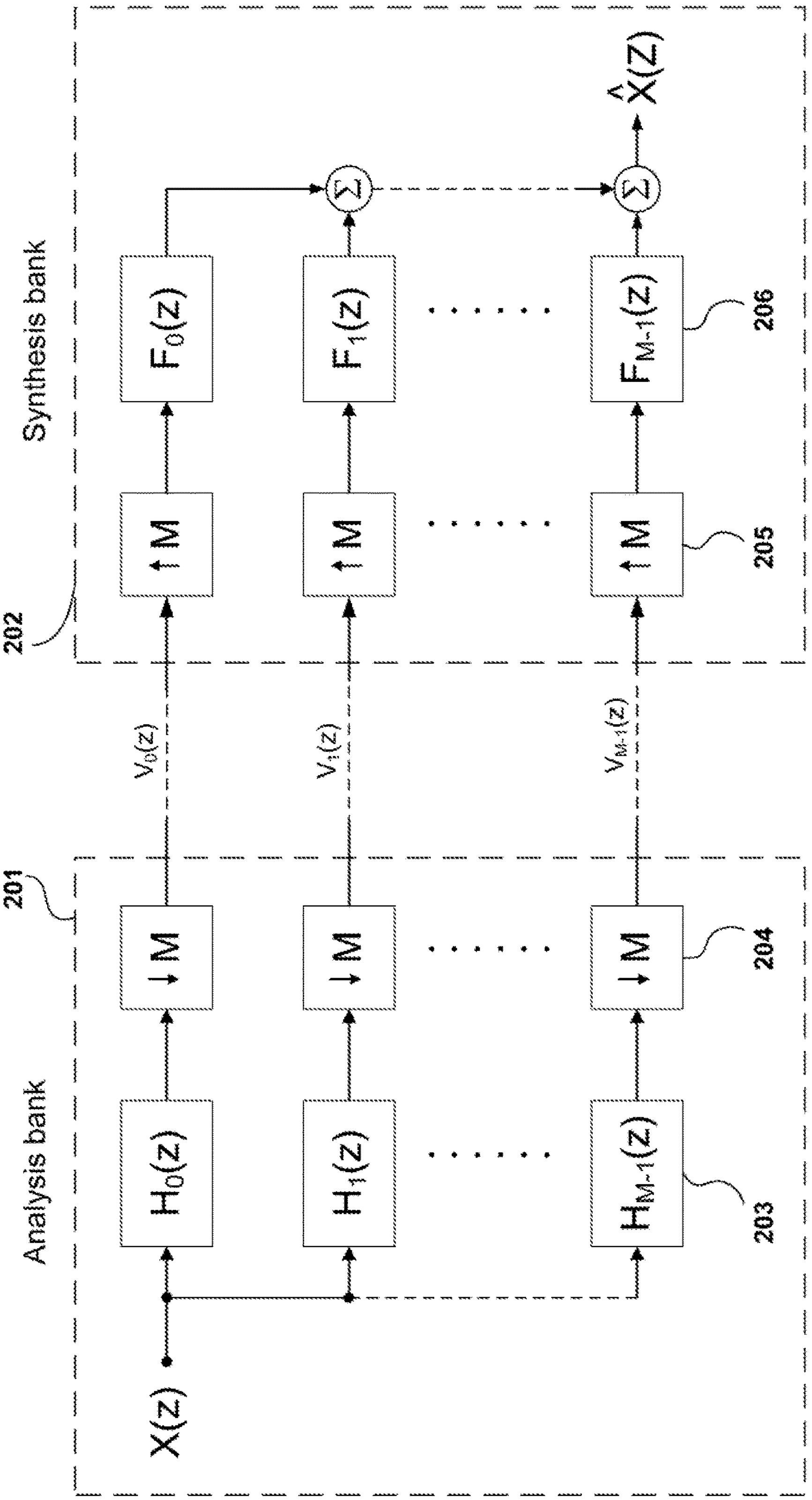
FIG. 2 shows a basic structure of a maximally decimated filterbank.

FIG. 2 shows the basic structure of a maximally decimated filterbank analysis/synthesis system. The analysis filter bank 201 splits the input signal into several subband signals. The synthesis filter bank 202 combines the subband samples in order to recreate the original signal. Implementations using maximally decimated filter banks will drastically reduce computational costs. It should be appreciated, that the invention can be implemented using several types of filter banks or transforms, including cosine or complex exponential modulated filter banks, filter bank interpretations of the wavelet transform, other non-equal bandwidth filter banks or transforms and multi-dimensional filter banks or transforms.

In the illustrative, but not limiting, descriptions below it is assumed that an L-channel filter bank splits the input signal $x(n)$ into L subband signals. The input signal, with sampling frequency $f_s$, is bandlimited to frequency $f_c$. The analysis filters of a maximally decimated filter bank (FIG. 2) are denoted $H_k(z)$ 203, where $k=0, 1, \ldots, L-1$. The subband signals $v_k(n)$ are maximally decimated, each of sampling frequency $f_s/L$, after passing the decimators 204, The synthesis section, with the synthesis filters denoted $F_k(z)$, reassembles the subband signals after interpolation 205 and filtering 206 to produce $\hat{x}(n)$. In addition, the present invention performs a spectral reconstruction on $\hat{x}(n)$, giving an enhanced signal $y(n)$.

The reconstruction range start channel, denoted M, is determined by $$M = \text{floor}\left\{\frac{f_c}{f_s}2L\right\}. \tag{2}$$

The number of source area channels is denoted S ($1 \le S \le M$). Performing spectral reconstruction through translation on $\hat{x}(n)$ according to the present invention, in combination with envelope adjustment, is accomplished by repatching the subband signals as $$v_{M+k}(n)=e_{M+k}(n)v_{M-S-P+k}(n), \tag{3}$$

where $k \in$, $[0, S-1]$, $(-1)^{S+P}=1$, i.e. S+P is an even number, P is an integer offset ($0 \le P \le M-S$) and $e_{M+k}(n)$ is the envelope correction. Performing spectral reconstruction through folding on $\hat{x}(n)$ according to the present invention, is further accomplished by repatching the subband signals as $$v_{M+k}(n)=e_{M+k}(n)v^*_{M-P-S-k}(n), \tag{4}$$

where $k \in [0, S-1]$, $(-1)^{S+P}=-1$, i.e. S+P is an odd integer number, P is an integer offset ($1-S \le P \le M-2S+1$) and $e_{M+k}(n)$ is the envelope correction. The operator [*] denotes complex conjugation. Usually, the repatching process is repeated until the intended amount of high frequency bandwidth is attained.

It should be noted that, through the use of the subband domain based translation and folding, improved crossover accuracy between the lowband and instances of translated or folded bands is achieved, since all the signals are filtered through filterbank channels that have matched frequency responses.

If the frequency $f_c$ of $x(n)$ is too high, or equivalently $f_s$ is too low, to allow an effective spectral reconstruction, i.e. $M+S>L$, the number of subband channels may be increased after the analysis filtering. Filtering the subband signals with a QL-channel synthesis filter bank, where only the L low-band channels are used and the upsampling factor Q is chosen so that QL is an integer value, will result in an output signal with sampling frequency $Qf_s$. Hence, the extended filter bank will act as if it is an L-channel filter bank followed by an upsampler. Since, in this case, the L(Q−1) highband filters are unused (fed with zeros), the audio bandwidth will not change—the filter bank will merely reconstruct an upsampled version of $\hat{x}(n)$. If, however, the L subband signals are repatched to the highband channels, according to Eq. (3) or (4), the bandwidth of $\hat{x}(n)$ will be increased. Using this scheme, the upsampling process is integrated in the synthesis filtering. It should be noted that any size of the synthesis filter bank may be used, resulting in different sampling rates of the output signal.

Figure 3:
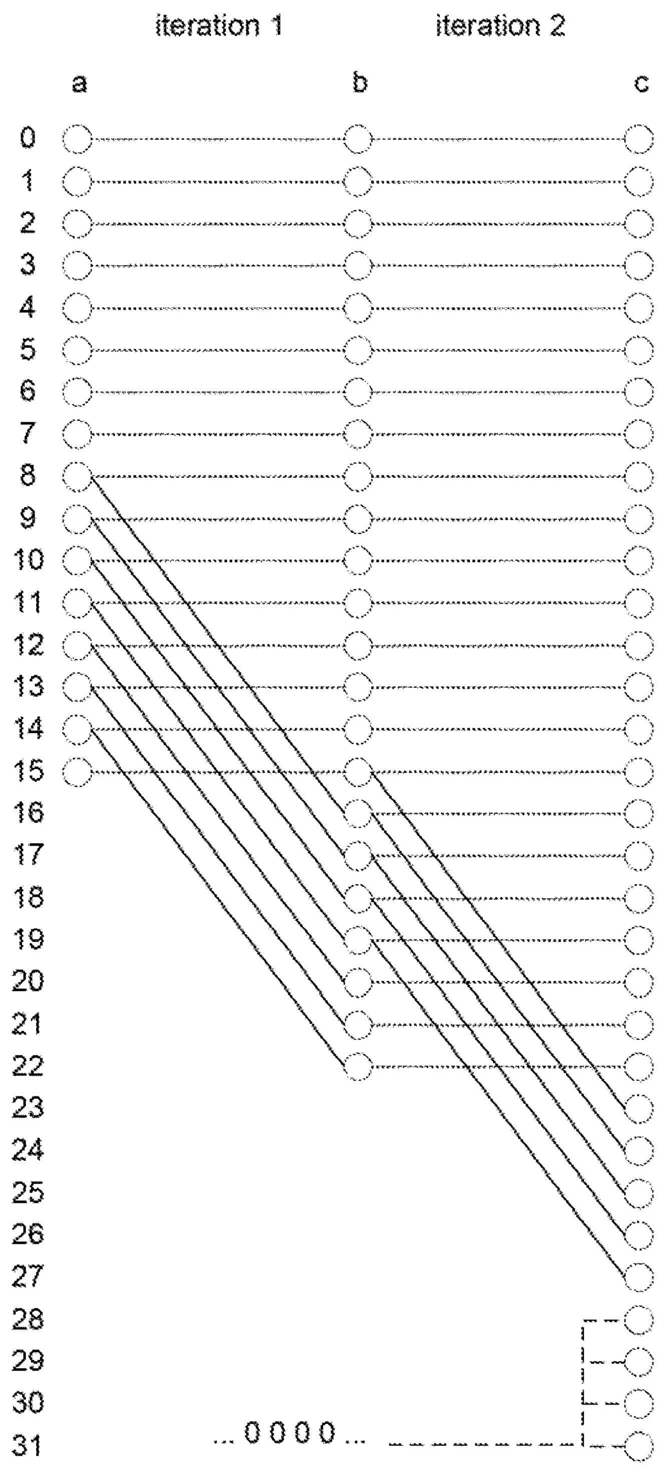
FIG. 3 illustrates spectral translation according to the present invention.

Referring to FIG. 3, consider the subband channels from a 16-channel analysis filterbank. The input signal x(n) has frequency contents up to the Nyqvist frequency ($f_c=f_s/2$). In the first iteration, the 16 subbands are extended to 23 subbands, and frequency translation according to Eq. (3) is used with the following parameters: M=16, S=7 and P=1. This operation is illustrated by the repatching of subbands from point a to b in the figure. In the next iteration, the 23 subbands are extended to 28 subbands, and Eq. (3) is used with the new parameters: M=23, S=5 and P=3. This operation is illustrated by the repatching of subbands from point b to c. The so-produced subbands may then be synthesized using a 28-channel filterbank. This would produce a critically sampled output signal with sampling frequency $28/16f_s=1.75\ f_s$. The subband signals could also be synthesized using a 32-channel filterbank, where the four uppermost channels are fed with zeros, illustrated by the dashed lines in the figure, producing an output signal with sampling frequency $2f_s$.

Figure 4:
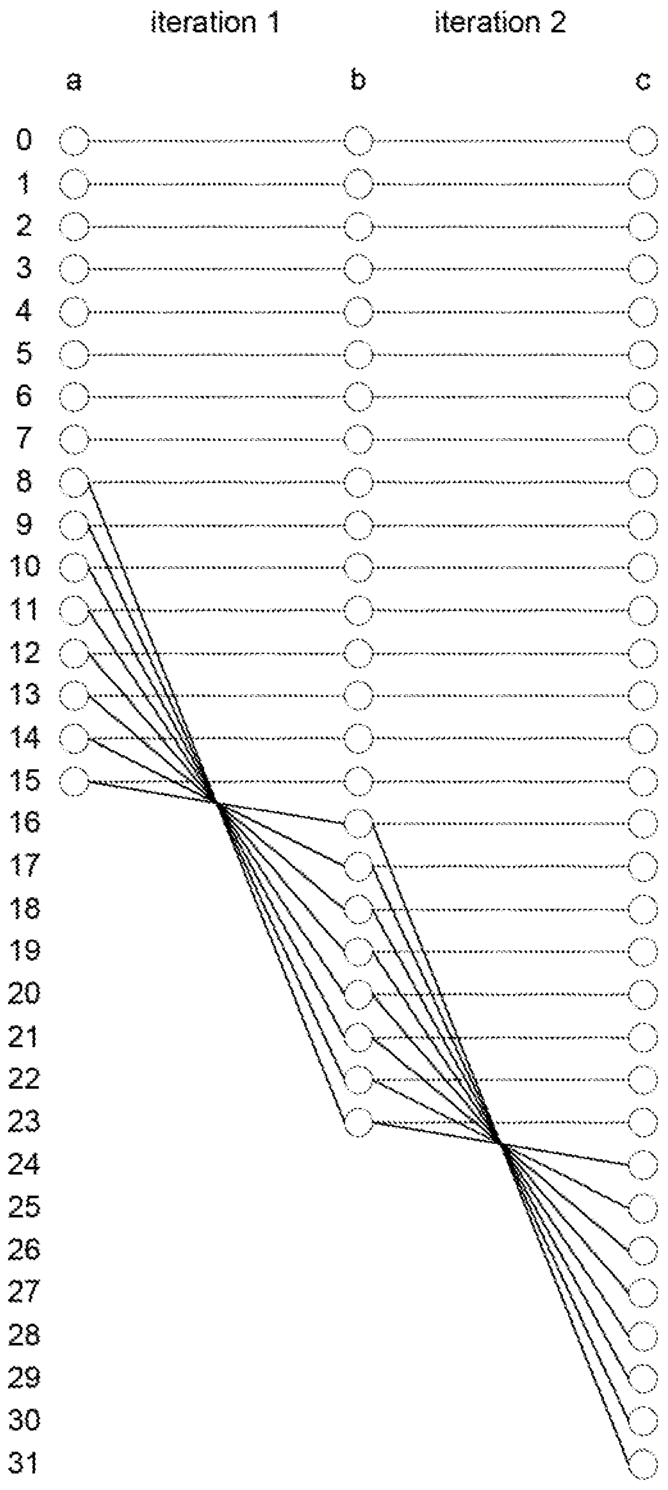
FIG. 4 illustrates spectral folding according to the present invention.

Using the same analysis filterbank and an input signal with the same frequency contents, FIG. 4 illustrates the repatching using frequency folding according to Eq. (4) in two iterations. In the first iteration M=16, S=8 and P=−7, and the 16 subbands are extended to 24. In the second iteration M=24, S=8 and P=−7, and the number of subbands are extended from 24 to 32. The subbands are synthesized with a 32-channel filterbank. In the output signal, sampled at frequency $2f_s$, this repatching results in two reconstructed frequency bands—one band emerging from the repatching of subband signals to channels 16 to 23, which is a folded version of the bandpass signal extracted by channels 8 to 15, and one band emerging from the repatching to channels 24 to 31, which is a translated version of the same bandpass signal.

Guardbands in High Frequency Reconstruction

Sensory dissonance may develop in the translation or folding process due to adjacent band interference, i.e. interference between partials in the vicinity of the crossover region between instances of translated bands and the low-band. This type of dissonance is more common in harmonic rich, multiple pitched programme material. In order to reduce dissonance, guard-bands are inserted and may preferably consist of small frequency bands with zero energy, i.e. the crossover region between the lowband signal and the replicated spectral band is filtered using a bandstop or notch filter. Less perceptual degradation will be perceived if dissonance reduction using guard-bands is performed. The bandwidth of the guard-bands should preferably be around 0.5 Bark. If less, dissonance may result and if wider, comb-filter-like sound characteristics may result.

In filterbank based translation or folding, guard-bands could be inserted and may preferably consist of one or several subband channels set to zero. The use of guardbands changes Eq. (3) to $$v_{M+D+k}(n)=e_{M+D+k}(n)v_{M-S-P+k}(n) \tag{5}$$

and Eq. (4) to $$v_{M+D+k}(n)=e_{M+D+k}(n)v{*}M{-}P{-}S{-}k(n) \tag{6}$$

Figure 5:
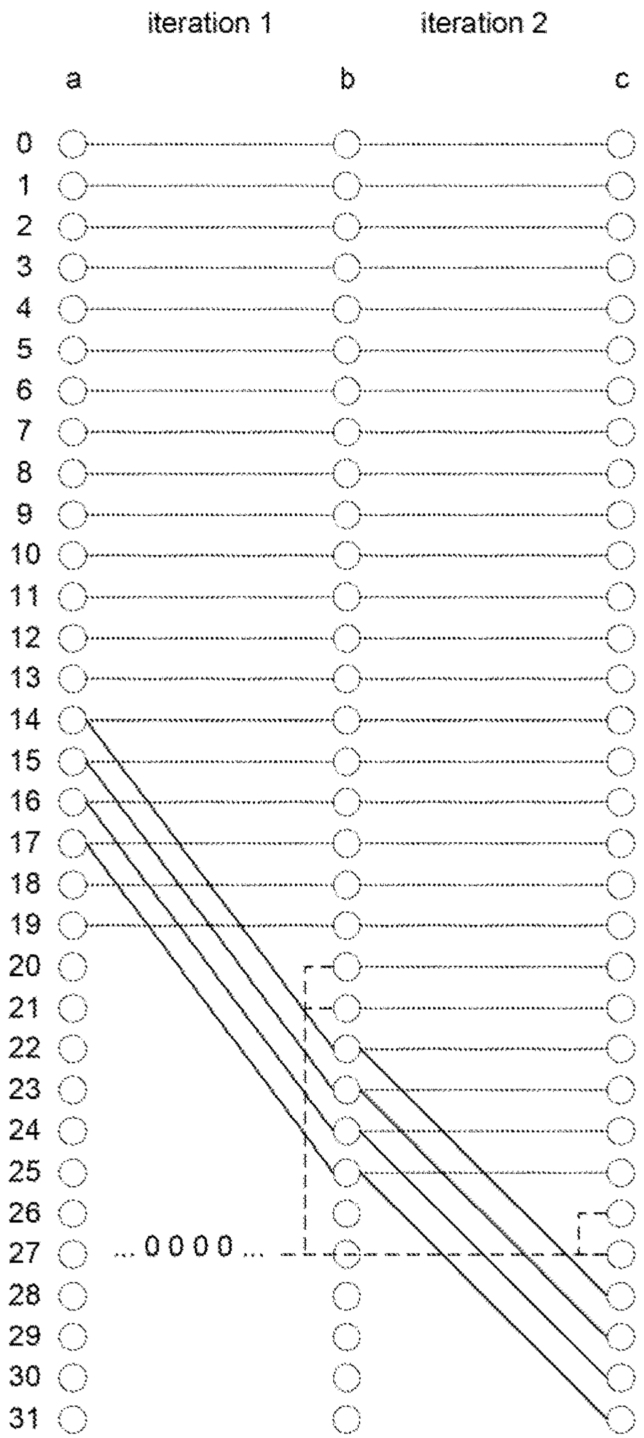
FIG. 5 illustrates spectral translation using guard-bands according to the present invention.

D is a small integer and represents the number of filterbank channels used as guardband. Now P+S+D should be an even integer in Eq. (5) and an odd integer in Eq. (6). P takes the same values as before. FIG. 5 shows the repatching of a 32-channel filterbank using Eq. (5). The input signal has frequency contents up to $f_c=5/16f_s$, making M=20 in the first iteration. The number of source channels is chosen as S=4 and P=2. Further, D should preferably be chosen as to make the bandwidth of the guardbands 0.5 Bark. Here, D equals 2, making the guardbands $f_s/32$ Hz wide. In the second iteration, the parameters are chosen as M=26, S=4, D=2 and P=0. In the figure, the guardbands are illustrated by the subbands with the dashed line-connections.

In order to make the spectral envelope continuous, the dissonance guard-bands may be partially reconstructed using a random white noise signal, i.e. the subbands are fed with white noise instead of being zero. The preferred method uses Adaptive Noise-floor Addition (ANA) as described in the PCT patent application [SE00/00159]. This method estimates the noise-floor of the highband of the original signal and adds synthetic noise in a well-defined way to the recreated highband in the decoder.

Practical Implementations

Figure 1:
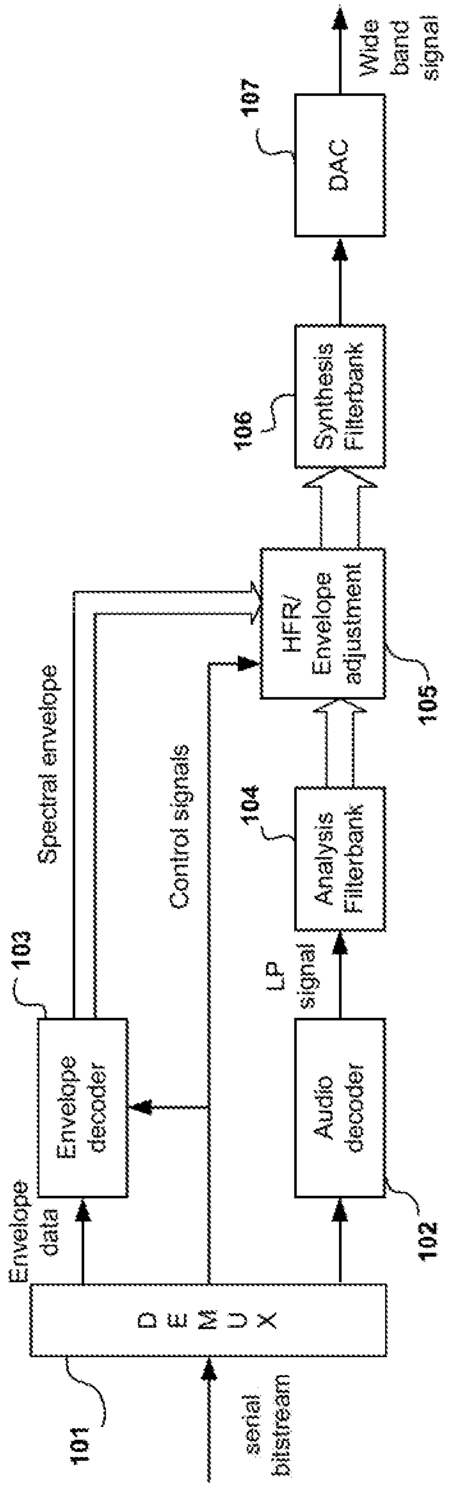
FIG. 1 illustrates filterbank-based translation or folding integrated in a coding system according to the present invention.

The present invention may be implemented in various kinds of systems for storage or transmission of audio signals using arbitrary codecs. FIG. 1 shows the decoder of an audio coding system. The demultiplexer 101 separates the envelope data and other HFR related control signals from the bitstream and feeds the relevant part to the arbitrary lowband decoder 102. The lowband decoder produces a digital signal which is fed to the analysis filterbank 104. The envelope data is decoded in the envelope decoder 103, and the resulting spectral envelope information is fed together with the subband samples from the analysis filterbank to the integrated translation or folding and envelope adjusting filterbank unit 105. This unit translates or folds the lowband signal, according to the present invention, to form a wideband signal and applies the transmitted spectral envelope. The processed subband samples are then fed to the synthesis filterbank 106, which might be of a different size than the analysis filterbank. The digital wideband output signal is finally converted 107 to an analogue output signal.

The above-described embodiments are merely illustrative for the principles of the present invention for improvement of High Frequency Reconstruction (HFR) techniques using filterbank-based frequency translation or folding. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. An apparatus for reconstructing a high frequency portion of an audio signal, the apparatus comprising:

a complex exponential modulated analysis filterbank for filtering a low frequency portion of the audio signal to produce a plurality of low frequency complex-valued subband signals, wherein the complex exponential modulated analysis filterbank includes a plurality of decimators;

a high frequency reconstructor that reconstructs the high frequency portion of the audio signal by patching both a real and an imaginary part of a consecutive number of the plurality of low frequency complex-valued subband signals to consecutive subbands of the high frequency portion; and a complex exponential modulated synthesis filterbank for generating a wideband audio signal by combining the reconstructed high frequency portion of the audio signal with the low frequency portion of the audio signal, wherein the complex exponential modulated synthesis filterbank includes a plurality of interpolators, wherein the high frequency reconstructor uses a parameter indicating a quantity of the consecutive number of the plurality of low frequency complex-valued subband signals.

2. The apparatus of claim 1 wherein the complex exponential modulated analysis filterbank and the complex exponential modulated synthesis filterbank have L channels.

3. The apparatus of claim 1 wherein the high frequency reconstructor is configured to reconstruct the high frequency portion of the audio signal with multiple patches.

4. The apparatus of claim 1 wherein the plurality of decimators each have a decimation factor of M.

5. The apparatus of claim 1 wherein the plurality of interpolators each have an interpolation factor of M.

6. The apparatus of claim 2 wherein the plurality of decimators and the plurality of interpolators each have an interpolation factor of M, which is equal to L.

7. A method for reconstructing a high frequency portion of an audio signal, the method comprising:

filtering a low frequency portion of the audio signal with a complex exponential modulated analysis filterbank to produce a plurality of low frequency complex-valued subband signals, wherein the filtering includes decimating the plurality of low frequency subband signals;

reconstructing the high frequency portion of the audio signal by patching both a real and an imaginary art of a consecutive number of the plurality of low frequency complex-valued subband signals to consecutive subbands of the high frequency portion; and generating a wideband audio signal with a complex exponential modulated synthesis filterbank by combining the reconstructed high frequency portion of the audio signal with the low frequency portion of the audio signal, wherein the generating includes interpolating the plurality of low frequency subband signals, wherein the reconstructing uses a parameter indicating a quantity of the consecutive number of the plurality of low frequency complex-valued subband signals.

* * * * *